United States Patent [19]

Hanna

[11] 3,946,123

[45] Mar. 23, 1976

[54] CANNED PET FOOD

[75] Inventor: Keith L. Hanna, Westminster, Calif.

[73] Assignee: Star-Kist Foods, Inc., Terminal Island, Calif.

[22] Filed: Mar. 10, 1975

[21] Appl. No.: 556,718

[52] U.S. Cl. .............. 426/643; 426/641; 426/646; 426/549; 426/560; 426/623; 426/104; 426/802; 426/805
[51] Int. Cl.² .............................................. A23K 1/10
[58] Field of Search .......... 426/643, 641, 646, 549, 426/560, 623, 104, 805, 802

[56] References Cited
UNITED STATES PATENTS

| | | | |
|---|---|---|---|
| 2,871,127 | 1/1959 | Barch et al. | 426/582 |
| 3,017,273 | 1/1962 | Marvin et al. | 426/643 X |
| 3,075,842 | 1/1963 | Shaver | 426/582 |
| 3,115,409 | 12/1963 | Hallinan et al. | 426/641 |
| 3,121,014 | 2/1964 | Jokay | 426/550 |
| 3,202,514 | 8/1965 | Burgess | 426/532 |
| 3,310,406 | 3/1967 | Webster | 426/603 |
| 3,561,972 | 2/1971 | Dodge et al. | 426/646 |
| 3,741,774 | 6/1973 | Burkwall | 426/582 |
| 3,852,483 | 12/1974 | Oborsh et al. | 426/549 X |

*Primary Examiner*—Joseph M. Golian
*Attorney, Agent, or Firm*—Fulwider, Patton, Rieber, Lee & Utecht

[57] ABSTRACT

There is disclosed a pet food containing a significant proportion of synthetic cheese or meat chunks which are formed from cereal products. The pet food is a canned product and the cereal chunks are stabilized against disintegration and agglomeration during retorting in the canning process by the incorporation of a minor amount of glycerol monostearate in the cereal chunks. The cereal chunks are prepared by mixing a hard or red wheat flour or farina with a minor amount of the glycerol monostearate, a minor amount of fat, a trace to minor amount of a flavoring agent, such as cheese, natural cheese flavor, fish or meat products, and trace to minor amounts of a coloring agent. The mixture is blended with sufficient water to form a moldable mixture which is extruded and chopped or pelleted into molded chunks that can be added directly to the pet food during its manufacture or that can be dried to a storage stable product for subsequent addition to a pet food. The pet food is prepared by blending an aqueous broth, from 15 to about 60 weight percent of a meat having from 20 to about 100 percent fish, from 0 to about 10 weight percent of a high-protein containing cereal meal, and from about 3 to 10 weight percent of the aforedescribed flavored cereal chunks, calculated on their dry weight. The pet food can contain, as optional ingredients, vitamins and vegetables. The pet food is thereafter canned using conventional canning and retorting procedures.

19 Claims, No Drawings

CANNED PET FOOD

BACKGROUND OF THE INVENTION

1. Field of Invention

This invention relates to a pet food, and in particular, to a pet food containing a significant quantity of a cereal product in a palatable form for carnivorous animals.

2. Description of the Prior Art

There has been an increase in popularity of chunky products for pet foods, particulary for canned pet foods where chunks of meats, fish or cheese are incorporated in aqueous broths containing flavoring and thickening agents, vegetables, vitamins and the like. The chunky ingredients of these foods are, however, relatively expensive and less expensive substitutes are desired.

Various attempts have been made to produce synthetic cheese or meat solids in the form of spreads or chunks by the use of gelatininzed starches and the like to coagulate and solidify mixtures of protein and fat. An undesirable aspect of these products is that they are not stable to cooking and, therefore, are ill-suited for canning, and must be preserved by dehydration, maintenance of high concentrations of sugar, and other methods which detract from their acceptability. Additionally, these products employ relatively minor amounts of starch and the basic or major components in these products are usually expensive proteins and fats. These synthetic materials are usually more expensive than the natural food and find market acceptance for spepcial diets where natural products would be objectionable because of the natural products' high cholesterol contents, tendencies to spoil, and other shortcomings.

Although it has been generally known that a minor amount of glycerol monostearate imparts non-sticking properties to cereals and cereal pastes, and thereby permits these materials to withstand prolonged cooking and retorting without becoming sticky or losing firmness, heretofore, there has been no application of this knowledge to the preparation of a synthetic cheese or meat solid. In particular, there has been no attempt to utilize glycerol monostearate to prepare retort-stable cereal chunks having a meat, fish or cheese flavoring agent and other components to enhance the simulation of a natural meat, fish or cheese product. Additionally, there has been no successful attempt to incorporate significant quantities of cereal products in pet foods while still maintaining a sufficiently high level of a palatability in the final product that finds ready acceptance by carnivorous animals trained or accustomed to a high-protein meat diet.

SUMMARY OF THE INVENTION

This invention comprises a chunky pet food having a significant quantity of a flavored cereal chunk product and to a method for the preparation of the pet food. The pet food has an aqueous medium or broth and contains from about 25 to about 90 weight percent of meat in chunk, flake or comminuted form, comprising from 20 to about 100 percent by weight of fish, and from 2 to about 10 weight percent, on their dry weight, of chunks of a flavored cereal product which is constituted of the following components, also expressed on a dry weight basis:

a. 85 to 99 percent by weight of a hard, red or durum wheat flour or farina;

b. 0.05 to about 5 weight percent of glycerol monostearate; and c. from 0.05 to 15 weight percent of cheese, cheese flavoring agents, fish or fish by-products.

The pet food can also contain, as optional ingredients, from 0 to about 10 weight percent of a high-protein cereal meal, vitamins as required to satisfy the animals'dietary requirements, and vegetables.

In its preferred embodiment, the pet food comprises an aqueous suspension of about 33 weight percent fish, most preferably tuna; about 5 weight percent of soy meal; and about 5 weight percent of cheese flavored chunks of a hard, red or durum wheat flour stabilized for cooking and retorting by the presence of about 0.2 weight percent of glycerol monostearate.

The method for manufacture of the aforedescribed pet food comprises: forming of flavored chunks of cereal by admixing a hard, red or durum wheat flour or farina with glycerol monostearate and a flavoring agent, preferably cheese or a natural cheese flavor, in the aforeindicated amounts, adding sufficient water to the mixture to prepare a moldable mixture, molding the mixture into chunks and admixing the chunks in an aqueous medium with meat particles, most preferably fish chunks or flakes, canning and retorting the pet food to prepare a canned pet food in which the flavored cereal chunks retain their firmness and shape, characteristic of a natural food.

DETAILED DESCRIPTION OF THE INVENTION

The pet food of this invention is an aqueous suspension or broth of meat and meat by-products consisting in part or entirely of fish, preferably tuna, and flavored cereal chunks. The meat and meat by-product particles can be sized from 0.1 to 1.5 inches, preferably from 0.2 to 0.7 inch in dimensions and can be in the form of flakes, cubes, pellets, balls, etc. The meat and meat by-products are present in an amount from 25 to 90 weight percent of the final pet food. When the meat particles are entirely fish, e.g., red meat tuna flakes, the meat particles are preferably used in the higher concentrations of the indicated range, e.g., from 35 to about 90 weight percent of the final pet food. The meat and meat by-products that may be used in the invention include the meat or meat by-products of fowl and fish, as well as that of mammals, such as, for example, cattle, swine, goats, horses, whales, etc. In general, animal meats containing proteinaceous material suitable for pet animal consumption may be used in the practice of the invention. The fish suitable for use in the invention include any of the commercial fish and fish by-products which, most preferably, are of tuna and tuna-like fish. As described herein, the class of tuna and tuna-like fish include: albacore, bluefin, southern bluefin, oriental tuna, blackfin tuna, northern bluefin, yellowfin, little tunie, kawakawa, skipjack, big-eyed tuna, etc. The portions of these fish which commonly find outlets in the pet food market comprise the less delectable proteins of the fish, typically the red meat portions that are recovered after removal of the white meat loins, and the like, for human consumption.

Regardless of the source, the meat portions are generally precooked typically by roasting or baking at temperatures of from 180° to 450° F. for a sufficient time to prepare a cooked meat product suitable for canning.

The flavored cereal product is employed in an amount expressed on its dry weight, from 3 to about 10 weight percent of the final pet food. The cereal chunk product is formed, principally, of a cereal flour or farina, i.e., a finely ground or subdivided cereal product. Suitable sources of cereal for use in the invention are the hard, red or durum wheats which are commonly used to manufacture alimentary pastes such as macaroni spaghetti and the like.

The cereal product also includes from 0.05 to 5 weight percent, preferably from 0.05 to about 0.3 and, most preferably, about 0.1 to 0.2 weight percent glycerol monostearate. Food grade glycerol monostearate is commercially available and the preceding amounts are based on use of the commercial product. The commercial product is not pure; it commonly is a mixture of 30 to 33 percent $\alpha$-glycerol monostearate, 45 to 47 percent glycerol distearate, 20 to 23 percent glycerol tristearate and 3 to 5 percent glycerine. There is also present a minor amount of $\beta$-glycerol monostearate. The active component is the $\alpha$-glycerol monostearate and if a more purified source is used, the amount of the additive could be reduced accordingly. The aforementioned amounts of the glycerol monostearate are sufficient to stabilize the cereal product during the cooking process and prevent the product from becoming sticky and agglomerating or disintegrating during the cooking process.

The cereal chunk product also includes a flavoring agent which imparts a meat, poultry, fish or cheese flavor to the product. The flavoring agent is employed in an amount from 0.05 to about 15, preferably from 0.1 to about 7, weight percent and is sufficient to impart a distinct flavor to the cereal product characteristic of meat, fish or cheese. Suitable flavoring agents include the natural products, i.e., meat, meat by-products, fish, fish by-products, cheese, cheese by-products or extracts thereof. It is preferred to use natural flavoring agents such as the aforementioned, however, synthetic flavoring agents are also available and can be used if desired. The meats, meat by-products, fish or fish by-products can be any of the aforementioned and, in addition, can include any of the following: clam, clam by-products, scallops, scallop by-products.

Optional ingredients which can be included in the cereal chunk product include from 0 to about 5 weight percent, preferably from 0.5 to 2 weight percent of a solid animal fat, e.g. lard, beef tallow, a hydrogenated vegetable oil, such as hydrogenated palm oil, cottonseed oil, peanut oil, etc. Preferably animal fat and, most preferably tallow is used. The fat additive can be added to improve the texture and flavor of the chunk cereal product.

The visual simulation of a natural food product can be enhanced by the incorporation of a food grade dye in the cereal chunk product. A large variety of food grade dyes can be employed, including titanium dioxide, beet powder, chlorophyll, alfalfa powder, tomato powder, carotenoids such as $\beta$-carotene, Roxanthin, etc., as well as the art recognized FD and C dispersible, water-insoluble, aluminum lake dyes. The amount of dye employed is, of course, that amount necessary to impart the desired color to the final product. Generally, this amount ranges from trace amounts to about 2 weight percent.

The cereal chunk product is generally prepared by premixing the flavor component, glycerol monostearate, and the optional fat and dye components, and blending the premixed components with the flour or farina in the proper proportions, as previously indicated. During the blending step, or subsequent thereto, sufficient water can be added to prepare a moldable mixture. Typically, the amount of water incorporated with these ingredients to form a moldable mixture is from 5 to about 30 weight percent of the final product.

The mixture, thus prepared, can be pelleted or extruded in conventional food processing equipment such as a pellet mill, extrusion press and the like, to prepare cereal chunks having a firm structure with smooth exterior skins. Typically, the final moisture content of the chunk product is from 10 to about 35 weight percent. Typically, the molded product is produced with lengths and diameters from 0.1 to about 1.5 inches, preferably from 0.3 to about 0.7 inch.

The formed chunks as thus described can be added directly to a pet food of the invention. If desired, however, the chunks can be dried by heating them at a temperature of from 190° to about 250° F. at subatmospheric or atmospheric pressure for a period from 10 minutes to several hours, sufficient to dehydrate the chunk product to a moisture content of from 1 to about 12 weight percent. The resultant products are storage stable and can be stored for indefinite periods without deterioration or decomposition. These products can readily be rehydrated to useful condition by direct addition to the aqueous medium of the pet food or by the addition of from 5 to about 30 weight percent water thereto.

The pet food of the invention is prepared by blending together the aforementioned cereal chunks, meat particles, water and various optional ingredients such as a high-protein content cereal meal, vegetables, vitamins and various thickeners to impart the desired viscosity to the aqueous medium.

In the preparation of the preferred fish base pet food, water is added to chunks or flakes of red meat tuna and the cereal chunks. If desired, a minor amount, from 0.1 to about 10 weight percent, of a proteinaceous cereal product having from 25 to about 50 percent protein such as soy meal can be added to the mixture to enhance its solids and protein content.

Water is the preferred aqueous medium which is employed in the preparation of the fish base pet food, however, broths can be employed for the other pet foods of the invention, if desired, and the aqueous media can be thickened by the addition of conventional thickening agents such as starches, carboxymethycellulose and sodium or potassium salts thereof, whey, etc. The amounts of thickening agent employed can be from about 1 to about 7 percent, preferably from about 3 to about 5 percent, of the aqueous medium.

Other optional components which can be incorporated in a pet food employing the cereal chunks of the invention comprise various vegetables useful, for example, when one wishes to prepare a stew-type product. Typically, chopped or whole vegetables such as corn, carrots, potatoes, beans, and the like, can be incorporated in the pet food in an amount from 5 to about 40 percent thereof.

The blended ingredients of the pet food are canned using the conventional canning procedures. Typically, the ingredients are introduced into conventional size cans, e.g., usually about 6.5 ounces capacity, retorted and sealed therein by heating and maintaining the ingredients at temperatures in the range from 220° to 275° F. for a variable period of time, sufficient to pasteurize the ingredients as dictated by the size of the containers. Typically, for a conventional size container of 6.5 fluid ounces, the retorting is practiced at 250° F. for a period of 60 minutes.

The invention will be descirbed by reference to specific illustrations that will serve to illustrate presently preferred embodiments and demonstrate results obtainable therefrom.

EXAMPLE I

A synthetic cheese product is prepared from a cereal flour employing the following recipe:

Table 1

| Component | Weight Proportions |
|---|---|
| Macaroni Flour | 92.83 |
| Tallow | 1.0 |
| Cheese Scraps | 5.0 |
| Glycerol Monostearate | 0.3 |
| Dye (Orange Beta Carotene) | 0.88 |
| Roxanthin Red 10 | 0.44 |

The ingredients are admixed by preparing an emulsion of all of the ingredients except the flour. The emulsion is prepared using approximately 20 parts by weight of water for each 80 parts of the total components of the aforementioned recipe. The emulsion is then blended into the flour and the resulting mixture is compacted into shaped products using a California pellet mill having a shaping die to produce particles approximately ⅛ inch in diameter and approximately ⅜ inch long.

EXAMPLE II

The example is repeated with the substitution of approximately 5 weight percent of fish scraps comprising chiefly scraps of clams and scallops for the cheese scraps employed in Example I. Approximately 1 weight percent of titanium dioxide is substituted for the beta carotene and Roxanthin dye employed in Example I, thereby closely simulating the natural color of clams and scallops. The mixture prepared by blending these components is pelleted in a similar pelletizing mill to prepare pellets of a synthetic fish product.

EXAMPLE III

A fish base pet food is prepared by blending together approximately 30 parts by weight of red meat tuna subdivided in flake form and approximately 5 parts, expressed as dry weight, of the synthetic cheese prepared in accordance with the procedure of Example I and 65 parts by weight of water. The mixture is placed in cans of 6.5 ounces fluid capacity and the cans are retorted at 250° F. for a period of 60 minutes, and sealed in a conventional canning process. Inspection of the canned product immediately after canning, and at extended storage periods thereafter, reveal that the synthetic cheese product maintains its chunky appearance and a cheese-like texture throughout retorting and subsequent storage periods.

EXAMPLE IV

A plurality of animal feeding experiments are performed to determine the palatability of pet food containing the flavored cereal chunks of the invention and to compare its palatability to that of an entirely meat product. In these experiments, a test group of approximately 10 cats, generally representative of the pet cat population, are fed, free-choice, sample of red meat tuna pet food containing the synthetic cheese chunks produced in accordance with Example I and unadulterated red meat tuna pet food. In this testing each of the test cats is kept in a separate cage and fed once a day for five days. The test and control pet foods are placed in separate but identical bowls, each bowl containing one of the sample feeds. The position of the bowls is randomly changed in the cages to prevent bias based on the position of the feeds bowls, and the results are observed for all of the cats over the five-day sample period. Separate and distinct colonies of test cats are employed for each of the comparative feeding experiments.

The following tables summarize the experiments and report the results, indicating the statistical level of confidence in the results.

Table 2

| | (Experiment 1) | | |
|---|---|---|---|
| Identification | Red Meat Tuna | Same + 5% Cheese Chunk | Probability of Chance Occurrence* |
| Total weight eaten | 2326 | 4528 | |
| Average weight eaten | 46.5 | 90.6 | |
| Wt/Wt ratio | 1 | 1.95 | <0.01 |
| Preferred ratio | 1 | 3.5 | <0.01 |

Table 3

| | (Experiment 2) | | |
|---|---|---|---|
| Identification | Red Meat Tuna | Same + 5% Cheese Chunk | Probability of Chance Occurrence* |
| Total weight eaten | 2987 | 5399 | |
| Average weight eaten | 59.74 | 107.98 | |
| Wt/Wt ratio | 1 | 1.81 | <0.01 |
| Preferred ratio | 1 | 2.57 | <0.01 |

Table 4

| | (Experiment 3) | | |
|---|---|---|---|
| Identification | Red Meat Tuna | Same + 5% Cheese Chunk | Probability of Chance Occurrence* |
| Total weight eaten | 3344 | 4663 | |
| Average weight eaten | 66.9 | 93.3 | |
| Wt/Wt ratio | 1 | 1.39 | <0.05 |
| Preferred ratio | 1 | 2.5 | <0.01 |

*Determined by statistical analysis of raw data.

The results are expressed in the total weights consumed of each of the test and control foods and the average weight of each of the foods eaten per cat. The preference of the cats for the pet food of the invention is also expressed at the weight ratios of the control and test pet foods consumed. The tabulated data also indicate the preference of the cats for the pet food of the invention by the ratio of the number of cats preferring the pet food of the invention to those preferring the control. The results are analyzed statistically and are found to be demonstrative of a significant preference of the test animals for the pet food within the indicated confidence levels.

The invention has been described by reference to presently preferred embodiments and illustrated with such embodiments. It is not intended that the invention be construed as unduly limited by this disclosure. Instead, it is intended that the invention be defined by the components, steps, and their obvious equivalents set forth in the following claims.

We claim:
1. A canned pet food consisting essentially of an aqueous medium and:
   from 15 to about 60 weight percent of meat comprising from 20 to 100 percent fish; and
   from 3 to about 10 weight percent, expressed on their dry weight, of chunks having a size from 0.1 to 1.5 inches of a flavored cereal product consisting of the following components, expressed on their dry weight:
   85 to 99 weight percent of a cereal product selected from the class of hard, red and durum wheat flours and farinas;
   0.05 to 5 weight percent of glycerol monostearate; and
   0.05 to 15 weight percent of a flavoring agent selected from the class consisting of cheese, cheese flavoring agents, fish and fish by-products.

2. The pet food of claim 1 also containing additionally up to about 10 weight percent of a soy meal having a protein content from 25 to about 50 weight percent.

3. The pet food of claim 2 wherein said soy meal is present in an amount from 0.1 to about 10 weight percent.

4. The pet food of claim 1 wherein said flavoring agent is cheese and is present in an amount from 0.05 to about 15 weight percent.

5. A pet food as recited in claim 4 wherein said chunks of flavored cereal product additionally containing food grade dye in an amount from trace amounts to 2 weight percent.

6. The pet food of claim 4 wherein up to about 5 weight percent of a solid fat is present in said chunks of cereal product.

7. The pet food of claim 6 wherein said fat is tallow.

8. The pet food of claim 1 wherein said whole meat is entirely fish.

9. The pet food of claim 8 wherein said fish is red meat tuna.

10. The pet food of claim 9 wherein said red meat tuna is present in an amount from 30 to about 90 weight percent.

11. The pet food of claim 1 wherein said meat chunks are present in an amount from 20 to about 50 weight percent.

12. The pet food of claim 1 wherein said aqueous medium contains from 1 to about 7 weight percent of a thickening agent.

13. A pet food as recited in claim 12 additionally containing from 5 to about 40 weight percent of the total composition of vegetables.

14. A method for the manufacture of a pet food which comprises;
   a. preparing a flavored cereal chunk by admixing from 85 to 99 percent of a cereal product selected from the class consisting of hard, red and durum wheat flours and farinas with 0.05 to about 5 weight percent of the glycerol monostearate and from 0.05 to 15 weight percent of a flavoring agent selected from the class consisting of cheese, cheese flavoring agents, fish, and fish by-products;
   b. compressing the resultant mixture to form chunks having dimensions from 0.1 to 1.5 inches;
   c. admixing from 3 to about 10 weight percent, expressed on their dry weight, of the chunks obtained in step (b) with an aqueous medium and from 15 to about 60 weight percent of meat comprising from 20 to 100 percent fish; and
   d. canning and retorting the pet food at temperatures from 220° to about 275° F.

15. The method of claim 14 wherein from 5 to about 30 weight percent water is admixed with the cereal chunk ingredients in step (a) to prepare a moldable mixture.

16. The method of claim 15 wherein the moldable mixture is compressed in a pellet mill.

17. The method of claim 14 wherein from 0.1 to about 7 weight percent of cheese scraps are added as the flavoring agent in step (a).

18. The method of claim 17 wherein particles of red meat tuna are admixed with the pet food ingredients as the whole meat in step (c).

19. The method of claim 18 wherein said particles of red meat tuna are added in an amount from 35 to about 90 weight percent based on the pet food.

* * * * *